Feb. 7, 1928.

H. C. MALLORY

ENGINE COOLING SYSTEM

Filed July 8, 1921

1,658,090

INVENTOR
HARRY C. MALLORY
BY John E. Hubbell
ATTORNEY

Patented Feb. 7, 1928.

1,658,090

UNITED STATES PATENT OFFICE.

HARRY C. MALLORY, OF NEW YORK, N. Y.; SUE R. MALLORY ADMINISTRATRIX OF SAID HARRY C. MALLORY, DECEASED.

ENGINE-COOLING SYSTEM.

Application filed July 8, 1921. Serial No. 483,203.

My present invention comprises improvements in that type of cooling system primarily devised for use for automobile and analogous internal combustion engines in which all or practically all of the heat abstracted from the engine by the cooling liquid is normally utilized in vaporizing the cooling liquid and is dissipated in a condenser in which the vapor is condensed, and in which provisions are advantageously made for regulating the capacity of the condenser as required to maintain a constant vapor pressure in the system and thereby maintain the liquid leaving the jacket at a constant temperature.

The general object of the present invention is to provide improved apparatus for the purpose specified characterized in particular by the simple and effective provisions which it comprises for maintaining a forced circulation of the cooling liquid through the jacket under varying conditions of use for separating the vapors formed from the unvaporized liquid passing through the jacket and condensing said vapors, and for maintaining in the system cooling liquid in variable excess over the minimum required for the operation of the system.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described a preferred embodiment of my invention.

Figure 1:
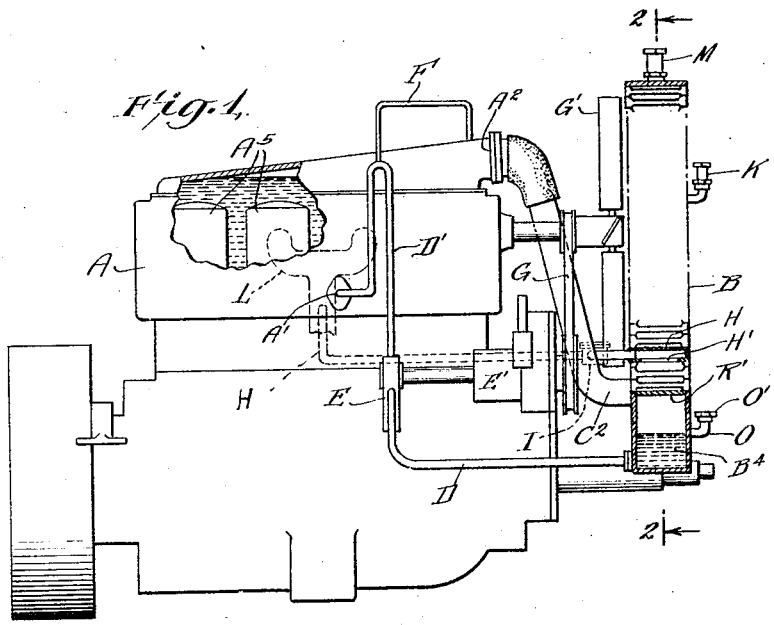
Figure 2:
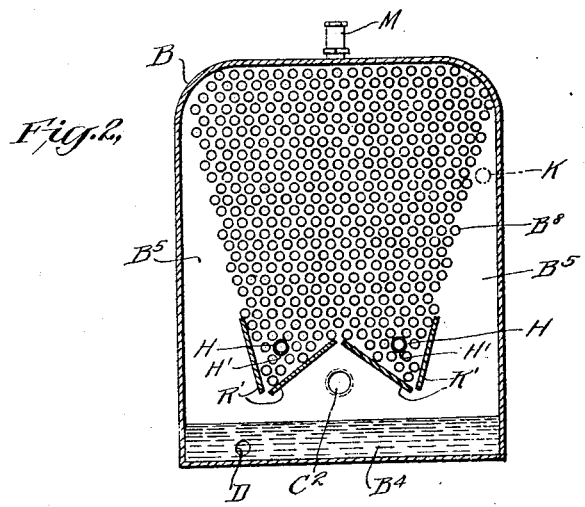

Of the drawings:

Fig. 1 is an elevation with parts broken away and in section of an automobile engine equipped with my improved cooling system; and Fig. 2 is a section on the line 2—2 of Fig. 1.

In the embodiment of my invention illustrated in the drawings, A represents the cooling liquid jacket for the cylinder $A^5$ of an ordinary internal combustion automobile engine. An inlet $A'$ is provided at the bottom of the jacket space for the cooling liquid which will ordinarily be water or a water and alcohol mixture, and $A^2$ represents an upper outlet from the jacket. In the particular construction shown the outlet $A^2$ opens from the end of the jacket space near its top and is of substantial size.

The outlet $A^2$ is connected to the bottom chamber $B^4$ of a condenser B by a downwardly inclined conduit $C^2$ which is so shaped and is of sufficiently large internal diameter as to normally provide a continuous open thoroughfare for the passage of vapor as well as to provide a path of flow for unvaporized liquid from the jacket outlet $A^2$ into the condenser chamber $B^4$. The condenser chamber $B^4$ serves both as the vapor inlet chamber and the hot well of the condenser. The condensing surfaces may be and are shown as being similar to the cooling surfaces of an ordinary automobile radiator comprising horizontally disposed open ended tubes connected together at their ends to form the corresponding portions of the end walls of the condenser shell. Air is drawn through the tubes by a fan $G'$. The tubes $B^3$ in the condenser B are spaced away from the lower edge of the condenser to provide a vapor space and hot well $B^4$ of appreciable size and are spaced away from the side edges of the condenser to provide vapor distributing channels $B^5$ through which the vapor enters the intertube space at its sides. Baffles $R'$ are provided to prevent the direct entrance of vapor into the lower end of the intertube space while permitting the ready escape of liquid of condensation. Advantageously as shown these baffles and the lower tubes are arranged to provide a central recess or notch in the tube bank into which the pipe $C^2$ opens. This makes it possible to locate the discharge end of the pipe $C^2$ well above the bottom edge of the hot well so that the latter can hold a considerable quantity of liquid without sealing the lower end of the pipe $C^2$ while at the same time the air removal pipes H hereinafter referred to may be surrounded by tubes B and still be below the path of the blades of the fan $G'$.

Liquid of condensation formed in the condenser, and unvaporized liquid entering the bottom chamber $B^4$ of the latter through the conduit $C^2$ are passed to the water inlet $A'$ of the jacket by a conduit D including a pump E. Advantageously in some cases the conduit D is formed as shown with a goose neck portion $D'$ extending to the water level which it is desired to maintain in the jacket to prevent the jacket from draining when the pump is stopped. To prevent siphon draining the goose neck should be vented as by means of the vapor equalizing connection F from the top of the goose neck into the top of the jacket. The pump E is driven from the engine shaft through a reduction gear conventionally illustrated at E' and through which the driving belt G for the fan G' is also driven.

Preferably provisions are made for admitting air to and withdrawing air from the condenser as disclosed in my prior Patent No. 1,424,664, August 1, 1922, and in my prior application, Serial No. 473,439, filed May 28, 1921, to thereby vary the capacity of the condenser as required to maintain an approximately constant vapor pressure and temperature in the condenser notwithstanding variations of engine load and in the temperature of the external atmosphere. The means shown for this purpose comprises piping H connected through a steam trap I to the suction intake manifold of the engine to thereby exhaust air from the condenser as required to maintain a minus pressure therein. As shown the piping H comprises two branches each of which projects through the condenser and is closed at its front end and is formed with an air inlet H' at its under side through which air may enter from the intertube space but into which water of condensation draining down from the condensing tubes B' will not fall. The piping H opens into the intertube space adjacent its lower end and preferably as shown, in the projection of the tube bank at the sides of the discharge end of the pipe C². The minus pressure maintained in the condenser is fixed by the adjustment of a vacuum relief valve K which automatically opens to admit air to the condenser when the pressure of the atmosphere exceeds the pressure in the condenser by a predetermined amount.

In the preferred contemplated mode of use of the apparatus shown in the drawings, the pump E passes water into the jacket at a rate appreciably in excess of the rate of evaporation, and the vapor formed in the jacket and the unvaporized portion of the liquid both pass out of the jacket through the outlet A² and thence through the pipe C² into the condenser chamber B⁴. The vapor entering the chamber B⁴ or liberated therein passes into the sides of the intertube space through the distributing channels B⁵ and is condensed. The liquid of condensation passes down through the intertube space into the hot well B⁴. The air entering into the system through leaky joints or admitted by the valve K tends to concentrate about the air pipes H, both because of its greater specific gravity, and because the character of the circulation in the condenser tends to carry it there. In consequence air may be removed through the piping H as required without removing appreciable amounts of vapor at the same time. If desired the pipe C² and the hot well walls may be insulated against heat losses thus facilitating the operation of the engine, and particularly the starting of the engine, in cold weather, as well as reducing the danger of trouble from freezing. The hot well B⁴ is advantageously proportioned to hold a considerable amount of water, and the water thus stored in the system is in excess of that required for regular operation, reduces the frequency with which water must be added to the system to make for liquid and vapor losses.

In the preferred construction and mode of operation contemplated, a free vapor space is maintained in the upper portion of the engine jacket into which all or the major portion of the vapor liberated in the system initially passes. The apparatus will still function however under conditions in which the fluid passing through the pipe is mainly boiling liquid and entrained vapor in which case the vapor to be condensed separates from the liquid wholly or mainly in the hot well B⁴. The described provisions for admitting air to and withdrawing air from the condenser insure the maintenance of a constant pressure in the latter, and also in the jacket since even when the large pipe C² is choked, so to speak, by boiling water there will be no appreciable pressure drop in the pipe C². In consequence the temperature at the top of the jacket will be approximately constant and equal to the temperature at which the cooling liquid boils under the pressure maintained in the condenser.

With the apparatus disclosed I obtain the advantages of a continuous forced circulation of liquid through the jacket coupled with the temperature control and radiator capacity characteristic of a cooling system in which the heat dissipated is wholly or mainly latent heat of evaporation liberated in the condenser. The piping required with the present invention is very simple. The proper amount of liquid may be maintained in the jacket A' at all times without requiring special overflow or control mechanism, and with a variable excess of liquid in the system.

While in accordance with the provisions of the statutes I have illustrated and described the best forms of my present invention now known to me, it will be apparent to those skilled in the art that changes may be made in the form of my invention without departing from the spirit of my invention as set forth in the appended claims, and that certain features of my invention may sometimes be used to advantage without a corresponding use of other features.

Having now described my invention, what

I claim as new and desire to secure by Letters Patent, is:

1. In a cooling system for internal combustion engines, the combination with the engine jacket, of a condenser comprising a shell and condensing surfaces so spaced within the shell as to provide a hot well and vapor space at the bottom of the shell and one or more vapor distributing channels extending upward from said space, an air outlet opening to the interior of said shell in the lower portion of the mass of condensing surfaces, a downwardly extending connection from the top of the jacket to the bottom of the condenser for passing liquid and vapor from the jacket into the bottom of the condenser, and means for passing liquid from the bottom of the condenser into the jacket.

2. In a cooling system for internal combustion engines, the combination with the engine jacket, of a condenser comprising a shell and condensing surfaces so spaced within the shell as to provide a hot well and vapor space at the bottom of the shell and one or more vapor distributing channels extending upward from said space, baffles between said space and the condensing surfaces preventing the direct upward flow of vapor into the lower end of the mass of condensing surfaces, an air outlet opening to the interior of said shell in the lower portion of the mass of condensing surfaces, a downwardly extending connection from the top of the jacket to the bottom of the condenser for passing liquid and vapor from the jacket into the bottom of the condenser, and means for passing liquid from the bottom of the condenser into the jacket.

3. In a cooling system for internal combustion engines, the combination with the engine jacket provided with a vertically extended outlet adjacent the top of a jacket, of a condenser comprising a shell and condensing surfaces so spaced within the shell as to provide a hot well and vapor space at the bottom of the condenser, a liquid outlet opening from the condenser at the bottom of the hot well, means for passing liquid out of the hot well through said outlet into the bottom of the jacket at a rate normally exceeding the rate at which liquid is vaporized in the jacket, a downwardly inclined connection from the jacket outlet to the condenser opening to the vapor and hot well space therein at a level appreciably above the outlet therefrom and normally providing both a path of flow for unvaporized liquid and an open thoroughfare for the passage of vapor from the jacket outlet into the hot well and vapor space of the condenser.

Signed at New York in the county of New York and State of New York this 7th day of July A. D. 1921.

HARRY C. MALLORY.